April 2, 1963     M. A. STRUMOR     3,083,486
ADVERTISING LETTER AND REPLY MEMBER
Filed Jan. 31, 1958
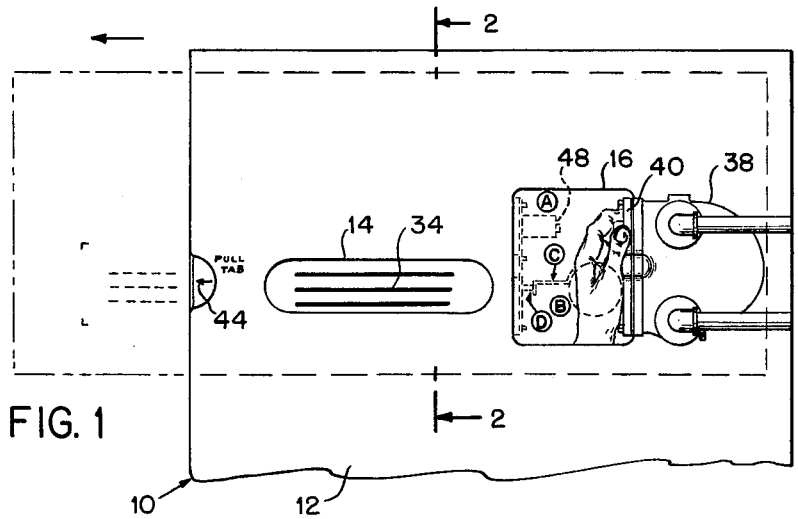
FIG. 1
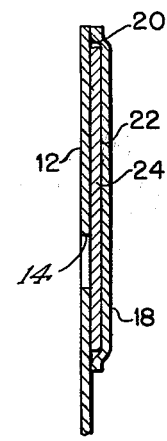
FIG. 2
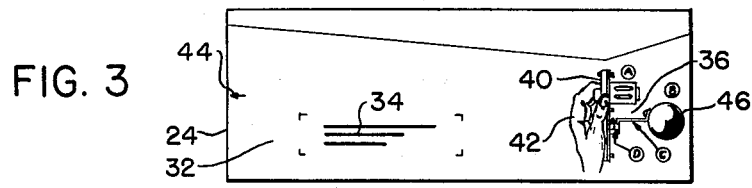
FIG. 3
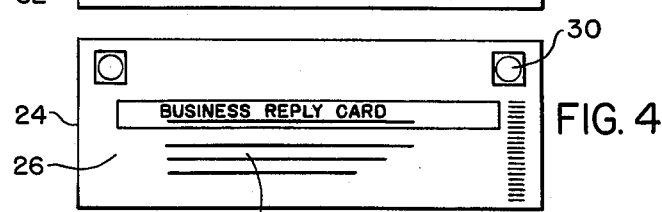
FIG. 4
FIG. 5
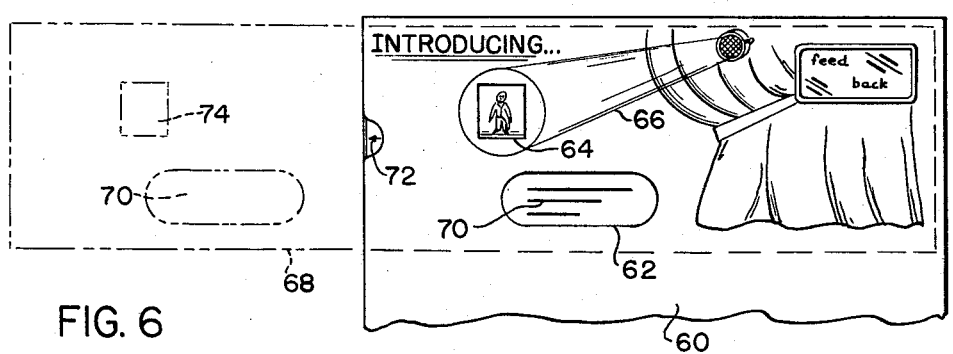
FIG. 6
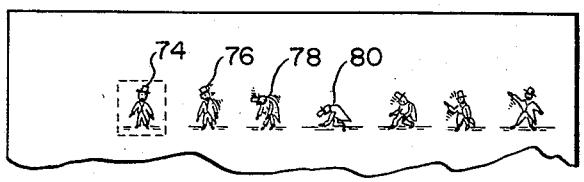
INVENTOR.
MATHEW A. STRUMOR
BY Kenneth S. Goldfarb
ATTY.

United States Patent Office 3,083,486
Patented Apr. 2, 1963

3,083,486
ADVERTISING LETTER AND REPLY MEMBER
Mathew A. Strumor, 27 Glenbrook Drive,
New Rochelle, N.Y.
Filed Jan. 31, 1958, Ser. No. 712,424
1 Claim. (Cl. 40—65)

This invention relates to a mailing piece and more particularly to an advertising letter having a pocket in which a reply member is removably positioned.

An important object of the present invention resides in the provision of means leading to a highly attractive and effective advertising display.

The concept of this invention lies in the provision of a letter sheet with an address opening and, further, with a picture window. Bonded to the letter sheet is a picture leaf. Received in the pocket formed between the letter sheet and the picture leaf is a reply member which may be either a reply card or a reply envelope, as desired.

An important feature of the invention lies in the provision of pictorial indicia on the letter sheet, together with a pictorial representation on the reply card which cooperates with the pictorial indicia. Further, when the reply card or envelope has been removed, there is provided a picture on the picture leaf which cooperates with the pictorial indicia on the letter sheet and is perceivable through the picture window.

A further object of the invention resides in the provision of advertising matter which may be conveniently mailed to a prospective client or customer and which is conveniently adapted to permit return mailing to the originator, thus making the use of this advertising material more effective.

Yet another object of the invention is to provide means enabling the operation of various types of equipment to be pictorially illustrated, as well as means enabling a better understanding of the working construction of various types of machines which are being advertised.

Still another object of the invention resides in the provision of means rendering it possible to provide entertainment to a prospective client or customer in an advertising letter which is forwarded.

Still another object of this invention resides in the provision of an advertising letter which is simple, effective in use, inexpensive to produce and pleasing in appearance.

These together with the various ancillary objects and features of the invention, which will become apparent as the following description proceeds, are attained by this advertising letter, preferred embodiments of which have been illustrated in the accompanying drawing by way of example only, wherein:

FIG. 1 is a partial elevational view of an advertising letter showing the reply member inserted in the point provided and showing in phantom lines a position to which the reply card may be moved, while further illustrating the pictorial representation which is provided on the reply member and also on the picture leaf forming parts of the advertising letter;

FIG. 2 is a transverse sectional detail view as taken along the lines 2—2 in FIG. 1;

FIG. 3 is a plan view of the reply member showing the address of the potential consumer or customer thereon;

FIG. 4 is a plan view of the reply member illustrating the reverse side of FIG. 3;

FIG. 5 is a partial plan view of a modified form of the advertising letter; and

FIG. 6 is a partial plan view of a modified reply member adapted to be used as part of the advertising letter shown in FIG. 5.

With continuing reference to the accompanying drawing wherein like numerals represent similar parts throughout the various views, reference numeral 10 generally designates an advertising letter constructed in accordance with the concepts of the present invention.

This advertising letter includes letter sheet 12 formed of paper or similar material having an address opening 14 therein, as well as a picture window 16. Bonded to the letter sheet 12 is a picture leaf 18 which by means of glue or other suitable adhesive is secured along three of its peripheral edges as at 20 to the letter sheet 12. This forms a pocket 22 in which a reply member 24 is adapted to be inserted. The reply member 24 is an elongated rectangular card or envelope in the form of a business reply card or a business reply envelope. Inscribed on the face, as indicated at 26 in FIG. 4, is the address 28 of the person sending out the advertising literature or a connected individual or company, as well as postage or postage guarantees as at 30. On the other side 32 of the reply member 24 is printed, engraved, inscribed or otherwise shown the address 34 of the potential customer or client to whom the advertising letter is being sent, or such other individual as may be interested.

Further there is provided a pictorial representation 36 in the form of engraved, inscribed or otherwise provided indicia which cooperate with the pictorial indicia 38 provided on the letter sheet 12 immediately adjacent the picture window 16.

Indicia 38, as shown, is a picture of a portion of a machine having a cover plate 40 which forms a portion of the pictorial representation 36. There is shown as a further part of the pictorial representation 36 a hand 42 grasping the cover plate 40. As the pull tab 44 forming a portion of the reply member 32 is pulled to move the reply member 24 outwardly of the pocket 22, the further portion 46 of the pictorial representation 36 is perceivable. This portion 46 of the pictorial representation 36 is an illustration of those parts forming the interior of the machine 38 and fixed to the cover plate 40. Hence, pulling the reply member 24 out of the pocket gives an action time display cooperating with the pictorial indicia 38 of the machine. There is printed or otherwise applied on the picture sheet 18 the equivalent of the portion 46 of the pictorial representation 36, which picture is indicated by phantom lines in FIG. 1 and designated by reference numeral 48. Thus, when the reply member 24 is pulled entirely out of the pocket 22, the interior of the machine becomes readily observable through the picture window 16.

Of course, when the reply member 24 is within the pocket 22, the address 34 is aligned with the address opening 14. In use, with the reply member properly positioned within the pocket 22, the letter sheet 12 is preferably folded and the entire device positioned in a window envelope with the address 34 on the card being aligned not only with the address opening 14 but with the transparent window in the window envelope. The prospective interested customer, client or other individual needs only to mail the reply member back to the originator whose address appears at 28 in order for the advertising letter 10 to have successfully served its purpose. Further, the address of the person who has sent the reply member back to the originator is clearly indicated at 34.

The envelope form of the reply member may be used in cases where it is desirable that the prespective client or customer enclose a remittance or other communication.

The reply card form of the invention is a desirable arrangement, since the reply card may be made out of relatively stiff paperboard or cardboard or other paperboard-like material which will rigidify the entire assembly and which will make it very easy to properly fold the letter sheet for positioning into an envelope in the obvious manner because of the rigidity of the reply card.

Referring now to the embodiment of FIG. 5, it will be seen that herein there is disclosed another arrangement in which the letter sheet 60 is provided with an address opening 62 and a window opening 64 which window opening is provided with indicia thereabout as indicated at 66 which highlights the window opening 64. In this form of the invention the window opening is situated on the left-hand side of the letter sheet with the reply card of member 68 being introduced into the pocket formed between the letter sheet and the picture lead.

There is provided on the reply member 68 not only the address 70 of the individual to whom the advertising letter is being forwarded but also a plurality of pictures as indicated at 74, 76, 78, 80, etc., which illustrate a figure in successive stages of action, thus providing a highly effective action display as the reply member 68 is pulled outwardly of the pocket after grasping the pull tab 72.

Various changes and modifications may be made without departing from the spirit and scope of the present invention and it is intended that such obvious changes and modifications be embraced by the annexed claim.

Having thus described the invention, what is claimed as new and desired to be secured by Letters Patent is:

An advertising letter comprising a letter sheet having an address opening therein and having a picture window therein spaced from said address opening, a rectangular picture leaf entirely separate from said letter sheet having four sides and being considerably smaller than said letter sheet, said picture leaf being bonded to the upper portion of said letter sheet along three of said sides of said picture leaf and forming a pocket between said leaf and said sheet, pictorial indicia on said letter sheet adjacent said picture window and cooperating with said picture window, a reply member disposed in said pocket and having a pictorial representation thereon alignable with said picture window so as to complement said pictorial indicia to complete a first stationary display when said member is in said pocket and to provide an action type display cooperating with said pictorial indicia as said member is withdrawn from said pocket, said picture leaf having a picture thereon in alignment with said picture window and complementing said pictorial indicia to complete a second stationary display different from said first stationary display, said reply member having address indicia thereon visible through said address opening for indicating the address of the party to whom said advertising letter is addressed.

References Cited in the file of this patent
UNITED STATES PATENTS

| | | |
|---|---|---|
| 946,407 | Spiegel | Jan. 11, 1910 |
| 1,036,930 | Tabler | Aug. 27, 1912 |
| 1,941,777 | Amos | Jan. 2, 1934 |
| 2,078,873 | Binger | Apr. 27, 1937 |
| 2,603,410 | True et al. | July 15, 1952 |
| 2,768,780 | Miller | Oct. 30, 1956 |
| 2,805,501 | Miller | Sept. 10, 1957 |